Figure 1:
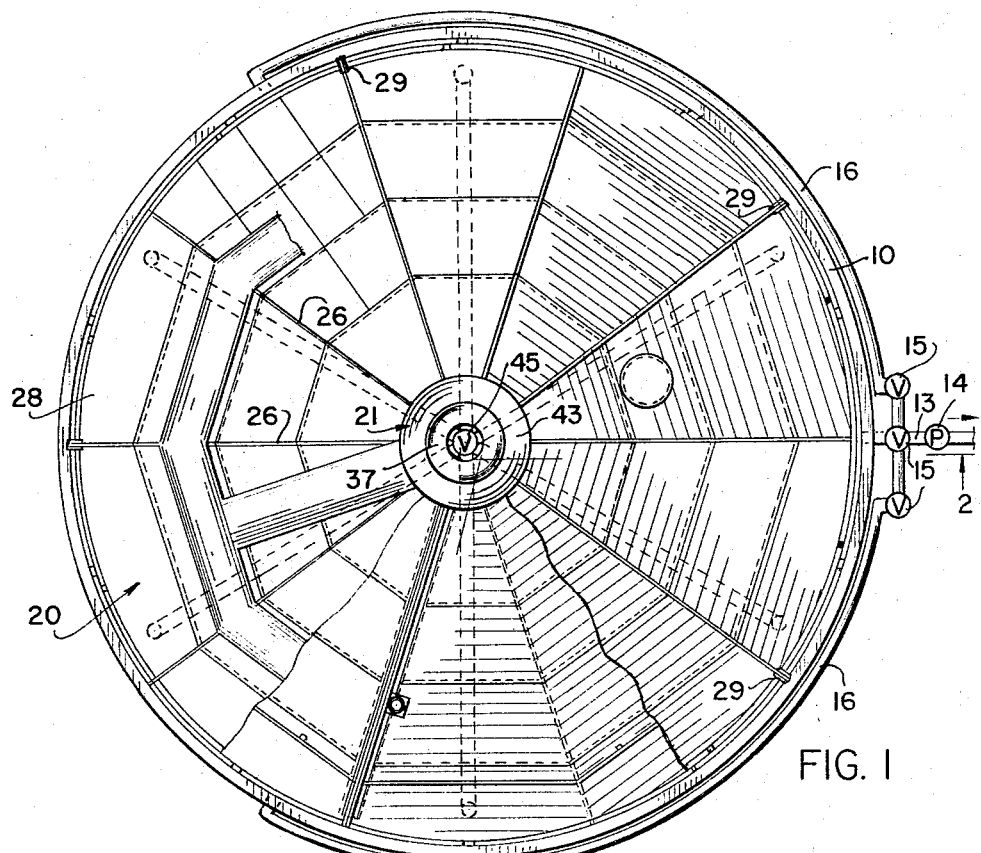

Oct. 18, 1966  C. B. COX  3,279,606
RING-TYPE GAS DOME FOR ANAEROBIC DIGESTERS
Filed Jan. 6, 1964  2 Sheets-Sheet 1

INVENTOR
CLIFFORD B. COX
BY
ATTORNEY

Oct. 18, 1966   C. B. COX   3,279,606
RING-TYPE GAS DOME FOR ANAEROBIC DIGESTERS
Filed Jan. 6, 1964   2 Sheets-Sheet 2
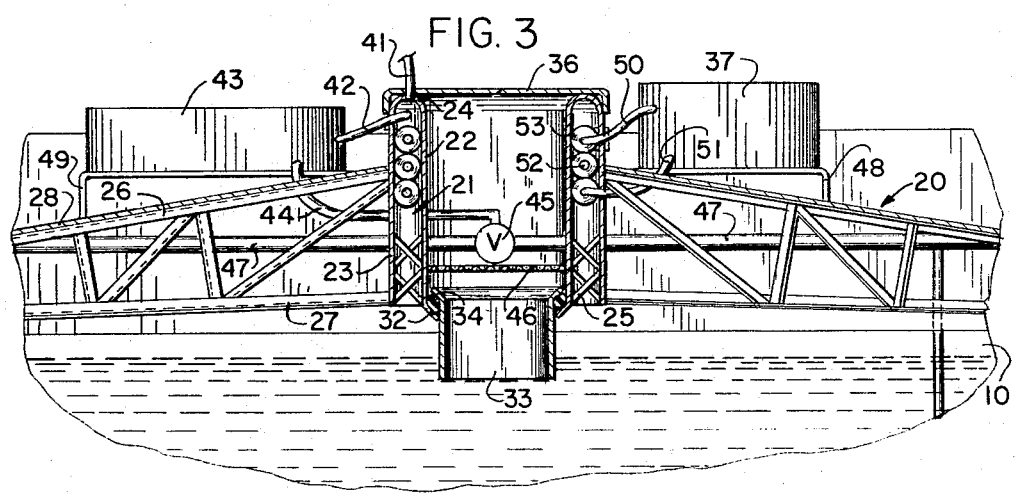
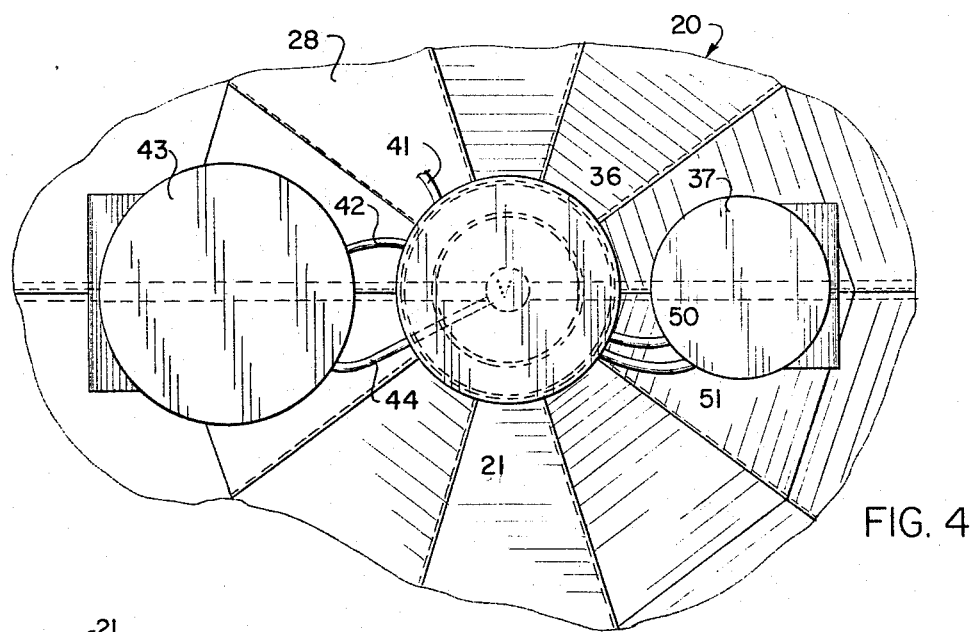
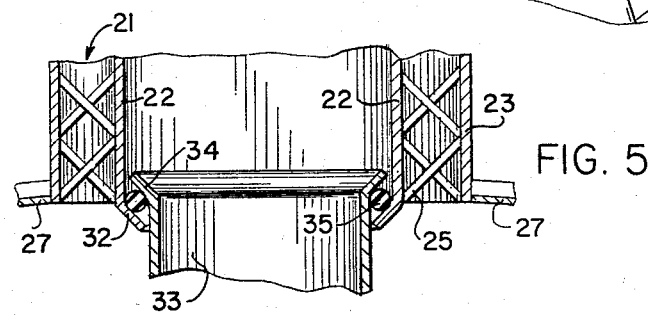
INVENTOR
CLIFFORD B. COX
BY A. Yates Dowell
ATTORNEY United States Patent Office 3,279,606
Patented Oct. 18, 1966

3,279,606
RING-TYPE GAS DOME FOR ANAEROBIC
DIGESTERS
Clifford B. Cox, Chicago, Ill., assignor to Pacific Flush
Tank Company, Chicago, Ill.
Filed Jan. 6, 1964, Ser. No. 335,946
5 Claims. (Cl. 210—187)

This invention relates to the treatment of waste matter or sewage of human or industrial origin and to apparatus and equipment in which such waste matter is subjected to a micro-biological process or anaerobic fermentation to cause the destruction of the waste matter.

The invention relates particularly to anaerobic digestion and the process of removing carbon and hydrogen from the organic matter by converting to carbon dioxide and methane gases and to apparatus for removing such gases as well as the digested sludge.

Digestion by anaerobic fermentation is an important process in the treatment and disposal of sewage solids and certain types of organic or industrial wastes which is both the cause and the source of nuisance in water pollution. Organic matter, both living and dead, is composed of carbon, hydrogen and lesser amounts of other chemical elements and the uncontrolled decomposition of such organic matter results in the production of foul odors (principally hydrogen sulphide from the reduction of sulphates) and disagreeable complex organic sulphides. The treatment of sewage and waste therefore is for the purpose of removing the carbon and hydrogen in organic matter.

In anaerobic digestion treatment or fermentation the carbon and hydrogen in organic matter are converted to carbon dioxide and methane gases. While the carbon in the carbon dioxide is completely oxidized that in the methane is not but methane is a very insoluble gas and is thus removed with the carbon dioxide leaving the waste in a more purified condition. This conversion of organic matter to carbon dioxide and methane is the result of the activity of a variety of micro-organisms which utilize the organic matter for their food supply and energy required for their growth and multiplication.

Sludge digestion or anaerobic fermentation is probably the most economical method of destroying organic matter in sewage or industrial wastes. Controlled digestion is economical because it will (1) reduce digester capacity allowances materially by successfully handling a greater amount of solids per cubic foot and by elimination of capacity allowances for effecting separation of digestion tank liquor; (2) increase effectiveness of digester capacity by greater reduction in solids and more uniform rate of gas production; (3) allow greater use of all tanks of a stage digestion system; (4) provide means for overcoming difficulties normally encountered in starting digestion tanks; and (5) eliminate loss of tank capacity due to scum accumulations.

Heretofore the operation of anaerobic sludge digesters generally has not been given the consideration it deserves and the digestion process has not reached the degree of perfection of other sewage treatment processes. Too often digestion tanks have been considered mainly as holding basins to provide a retention time of thirty days or more and have been operated as a take-up to accommodate other operations in the sewage treatment system.

When raw sewage solids are added to the sludge digestion tank there is a tendency for a substantial portion of the solids to float and form a layer of scum due to the greases present and also due to the fact that they have started to form some gas and their specific gravity has thus been reduced. Even with gas and liquor recirculation, there will remain a gradual accumulation of relatively non-digestible material in the upper portion of the digester. This material may consist of coarse fibrous matter, hair, feathers, floating synthetic or non-organic materials, mineral oils, or other non-digestible liquids and solids with specific gravities less than water and which resist bacterial decomposition for an extended indefinite length of time and which eventually will occupy a substantial portion of the space provided for anaerobic digestion. Also, gradual accumulations of non-digestible mineral grit and other inert materials having specific gravities greater than water and which settle to the bottom of the tank eventually occupy a substantial portion of the space provided for anaerobic digestions. As a result the anaerobic digester has had to be taken out of operation periodically to permit removal of these inert materials. Usually it requires from 60 to 120 days to clean the digester tank and then re-establish proper conditions for efficient bacterial activity and performance since the digested sludge must be drawn off to sand beds or other means of disposal, the supernatant liquor must be transferred to another digester or disposed of. After the liquor and sludge have been removed, the tank must be thoroughly ventilated since the gas fumes still in the tank are toxic as well as highly volatile. Then workmen enter the tank and remove the non-digestible matter by means of dip buckets working through the open top of the gas dome or through a supplemental opening cut through the roof deck and ceiling plate or in some cases by removing a floating type cover. Thus much time is lost and accomplishment of the purpose intended is reduced, unless substantial excess capacity is provided.

In order to accelerate the decomposition of the sludge within the digestion tank, the liquid normally has been heated to a temperature of approximately 95° F. At this temperature the gas which is formed during the decomposition process is saturated and when such gas is removed from the tank and directed to locations of use, storage or disposal through pipes customarily exposed to normal atmospheric temperatures, the liquid in suspension will condense and create a serious nuisance problem.

It is an object of the invention to overcome the difficulties enumerated and to provide a ring type gas dome for anaerobic digesters which permits the non-digestible mineral grit and other inert materials at the bottom of the tank and the floating non-digestible matter at the top of the tank to be removed while the tank continues in operation.

Another object of the invention is to provide means for the collection, removal and distribution of relatively clean and dry sludge gas as well as to provide means for modifying the temperature of the gas for removing water in suspension.

Figure 2:
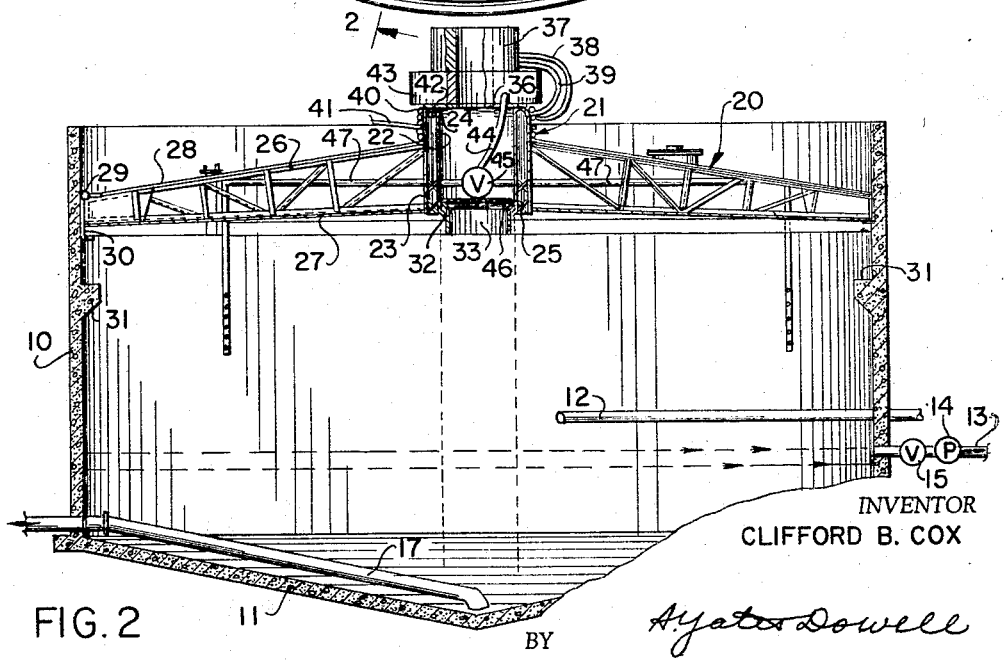

Other objects and advantages of the invention will be apparent from the following description taken in conjunction with the accompanying drawing in which:

FIG. 1 is a top plan view of the anaerobic sludge digester of the present invention;

FIG. 2, a vertical section on the line 2—2 of FIG. 1;

FIG. 3, a fragmentary section of a modified form of the invention;

FIG. 4, a top plan view of the structure of FIG. 3; and,

FIG. 5, an enlarged fragmentary section of FIG. 3.

Briefly stated the present invention is an anaerobic sludge digester which may be used independently or may be utilized as one stage of a multiple stage process. The digester of the present invention includes a tank having a floating or fixed cover, means for introducing heated or unheated waste matter into such tank, and means for removing non-digestible mineral grit and digested sludge therefrom. The cover is provided with means for trapping gases generated during the decomposition of the organic matter, means for modifying the temperature of the trapped gas to remove any liquid in suspension therefrom, means for disposing of the relatively clean dry gases, and means providing access for the removal of non-digestible floating matter from the surface of the liquid within the tank and non-digestible matter from the bottom thereof without interrupting the bacteriological process or taking the digester out of service.

With continued reference to the drawings the anaerobic sludge digester of the present invention comprises a circular tank or container 10 having a bottom 11 inclined downwardly toward the central portion thereof and an inlet 12 for raw or partially digested sludge. The tank 10 is provided with a circulating line 13 in which a pump 14 is located and such circulating line is connected by valves 15 to a plurality of pipes 16 connected to the tank in spaced relation about the periphery. The circulating line 13 is utilized for removing the sludge from the tank, subject to the operation of the pump 14 and one or more of the valves 15, and heating the sludge to accelerate the decomposition thereof and thereafter returning such sludge to the tank or, if desired, line 13 can be connected to a second digester and cause the sludge to be transferred from one digester to the other. A fixed discharge line 17 is provided in the bottom portion of the tank for removing digested sludge and nondigestible grit from the central portion of the tank 10.

The upper portion of the tank 10 is closed by a cover 20 of either the floating or fixed type having a ring type gas dome 21 disposed centrally thereof. The gas dome 21 includes a chamber constructed of a pair of generally cylindrical tubular members or sleeves 22 and 23 closed and sealed at their upper ends by a closure plate 24 and maintained in concentric relation by braces 25. Preferably the area of the inner sleeve 22 is approximately one percent of the total tank area and the area of the space between the concentric sleeves is approximately one percent of the tank area. A plurality of trusses 26 are connected to the outer periphery of the outer sleeve 23 and extend generally radially thereof to a position adjacent to the inner periphery of the tank 10. The trusses are connected by and are mounted on a ceiling plate 27 and are covered by a shield or rainshed 28.

When a floating type cover is used, certain of the trusses are provided with rollers 29 adapted to engage the inner periphery of the tank 10 to permit vertical movement of such cover. A gas deflector skirt or rim plate 30 projects downwardly around the periphery of the cover to deflect the gas generated within the tank toward the center thereof and at the same time prevent the escape of any gas between the cover and the tank wall. A plurality of cover support brackets 31 may be disposed about the inner periphery of the tank. The rim plate is designed to transfer the load from the trusses 26 to the brackets 31 when the cover 20 is resting thereon and when sufficient sludge has been introduced into the tank the cover will float on the liquid so that as more liquid is introduced the cover will be raised from the support brackets 31.

The cover is dome-shaped or inclined toward the central area so that sludge gas generated during the digestion of the sludge is directed toward the central gas dome 21. In order to prevent the escape of the gas through the dome 21, the inner sleeve 22 terminates in a downwardly and inwardly inclined flange 32 which receives a skirt 33 having a cooperating upwardly and outwardly turned flange 34 with a gas seal 35 therebetween. The lower portion of the skirt 33 extends downwardly to a position below the level of the liquid within the tank when the tank is full and in operating condition. The area below the gas dome 21 is kept clear of obstructions so that any non-digestible solids which collect on the bottom of the tank and which are not removed by the discharge line 17 can be removed by bailing or the like without interfering with the operation of the digester. The skirt 33 is removable so that any floating non-digestible solids which gravitate toward the center of the tank likewise can be removed without interfering with the operation of the digester. The upper portion of the gas dome 21 is closed by a removable weather cover or cap 36.

It is desirable to remove the moisture from the gas which has collected in the chamber between the sleeves 22 and 23 and then to remove the dry gas. This is accomplished by providing a removable refrigerating unit 37, as illustrated in FIG. 2, having lines 38 and 39 connected to coils 40 in heat exchange relation with the sleeve 22 to lower the temperature of the collected sludge gas. The transfer of heat will result in the condensation of moisture suspended in the gas and such condensate will drain into the bottom of the gas dome and serve to keep moist any floating matter that might accumulate there. The dry gas is removed from the upper portion of the area between the sleeves through an overhead gas take-off line 41 and conducted elsewhere for utilization, storage, or waste. If desired a portion of the gas may be supplied through a line 42 to a compressor 43 and directed through a line 44 to a rotary valve 45 mounted on a removable grating 46 disposed within the inner sleeve 22. From the rotary valve, the gas is directed through a plurality of lines 47 and is discharged into the liquid of the tank to accelerate the digestion process in a manner similar to that described in Patent 2,768,136.

As illustrated in FIGS. 3 and 4, a slightly modived form of the invention is provided in which the refrigerating unit 37 and the compressor 43 are mounted on platforms 48 and 49 respectively disposed on opposite sides of the gas dome 21. In this modification the refrigerating unit is connected by lines 50 and 51 to coils 52 located between the sleeves 22 and 23 and having fins 53 providing increased surface area.

In the operation of the device raw or partially digested sludge is introduced into the circular tank 10 which has a floating or fixed ring-type dome covering the matter within such tank and such sludge is permitted to be digested by a microbiological or anaerobic fermentation process. Digested sludge and non-digestible grit which collect in the central portion of the bottom are adapted normally to be removed by a discharge line 17. Gases generated by the digestion of the sludge are collected in the hollow area or chamber between the concentric sleeves 22 and 23 where most of the moisture in suspension is removed and the dry gas is conducted elsewhere for utilization, storage, or waste. If desired a portion of the gas may be compressed and directed through the valve 45 into a plurality of lines 47 which circulate the gas back through the sludge to accelerate the decomposition and digestion thereof.

In order to remove excessive amounts of non-digestible grit and digested sludge which have accumulated outside of the influence of the discharge line 17 and to remove non-digestible floating matter, the cap 36 is removed from the gas dome 21 after which the grating 46 and rotary valve 45 may be removed. Since the central portion of the tank is free of pipes and other obstructions, a manually operated scoop or other device may be lowered down through the inner sleeve 22 and the skirt 33 and lowered to the bottom of the tank for removal of the accumulated grit and sludge. In order to remove non-digestible floating matter the skirt 33, which normally extends downwardly below the liquid level, is raised so that the non-digestible floating matter will move toward the central portion of the tank and can be readily scooped and removed. If desired the scoop may be extended laterally to remove substantially all of the non-digestible floating matter as well as foam from the top of the liquid.

It will be apparent that an anaerobic digester having a fixed or floating cover with a ring-type gas dome is provided which will permit non-digestible mineral grit to be removed from the bottom of the tank as well as permit non-digestible floating matter to be removed from the top of the tank while the tank remains in operation.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. An anaerobic sludge digester for the fermentation of waste matter by a micro-biological process comprising a circular tank, a cover for said tank, a ring-type gas dome disposed centrally of said cover, means for introducing sludge into said tank, means for discharging digested sludge and non-digestible grit from said tank, said ring-type gas dome including generally concentric tubular members forming an annular chamber into which sludge gases are directed, means within said chamber for removing moisture from the gases therein, a plurality of trusses extending radially from said tubular members to a position adjacent to the inner periphery of said tank, a ceiling plate carried by said trusses, a rim plate disposed about the outer periphery of said ceiling plate and projecting downwardly therefrom, said cover adapted to float on the liquid within said tank and permit the liquid level to vary and accommodate unequal rates of liquid addition and withdrawal, as well as accommodate expansion and contraction of the tank contents, a removable downwardly depending skirt carried by said tubular members for directing gases into said chamber, means for removing the sludge gases from between said tubular members, and means whereby non-digestible grit can be removed through said gas dome from the bottom portion of said tank and floating non-digestible matter may be removed through said dome from the upper portion of said tank without interfering with the operation of the digester.

2. A gas dome for an anaerobic digester tank having a cover with a lower substantially frusto-conical surface and a body of waste matter in said tank comprising inner and outer generally concentric sleeves closed at their upper ends and defining a substantially vertical ring-type collection chamber, said chamber extending through said cover and terminating above the waste matter in said tank, removable skirt means carried by said inner sleeve and extending downwardly into said waste matter, said cover and said skirt means adapted to direct gases generated by said waste matter into said chamber, means for removing gases from said chamber, and cap means for said gas dome, whereby said cap means and said skirt means may be temporarily removed so that non-digestible matter can be removed from said tank without interfering with the operation of said digester and to permit said digester to continue in operation.

3. The structure of claim 2 including means for removing moisture in suspension from the gases within said chamber.

4. The structure of claim 2 including means for modifying the temperature of the gases within said chamber to remove moisture in suspension therefrom.

5. The structure of claim 2 including means for selectively recirculating a portion of said gases back into said waste matter to accelerate the digestion of said waste matter.

References Cited by the Examiner
UNITED STATES PATENTS

| | | | |
|---|---|---|---|
| 1,912,595 | 6/1933 | Schlenz | 210—187 |
| 2,202,772 | 5/1940 | Durdin | 210—13 |
| 2,477,772 | 8/1949 | Simpson | 165—111 X |
| 2,640,027 | 5/1953 | McNamee et al. | 210—13 |
| 2,768,136 | 10/1956 | Wright. | |

REUBEN FRIEDMAN, *Primary Examiner.*

SAMIH ZAHARNA, *Examiner.*

C. M. DITLOW, *Assistant Examiner.*